Sept. 29, 1931.                F. J. PLYM                1,825,419
                                SCREW
                       Original Filed May 11, 1929
Fig. 1.
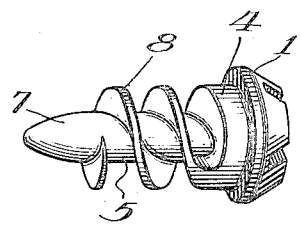
Fig. 2.                          Fig. 3.
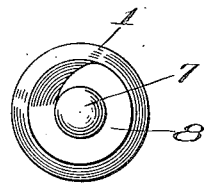            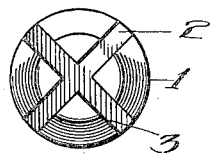
Fig. 4.
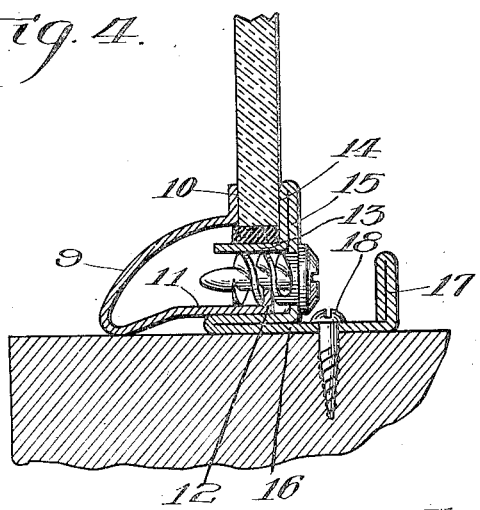
Inventor:
Francis J. Plym,
By Wallace P. Lane
          Atty.

Patented Sept. 29, 1931

1,825,419

UNITED STATES PATENT OFFICE

FRANCIS J. PLYM, OF NILES, MICHIGAN, ASSIGNOR TO THE KAWNEER COMPANY, OF NILES, MICHIGAN, A CORPORATION OF MICHIGAN

SCREW

Original application filed May 11, 1929, Serial No. 362,365. Divided and this application filed December 26, 1929. Serial No. 416,368.

The present invention relates to screw constructions, and more in particular to a novel screw or helically grooved member adapted for use in holding and positioning retaining members or the like. This application is a division of my co-pending application Serial No. 362,365, filed May 11, 1929.

Among the objects of the present invention are to provide a novel screw or helically grooved member adapted to adjustably mount and retain a pair of holding members in any desired adjusted position, said screw member being provided with spaced threads adapted to intercept a flange, ledge or projection, between its adjacent threads and to draw said members into proper position and relation.

A further object is to provide a screw or helically grooved member adapted to draw a pair of members such as inner and outer sash members, into proper seating engagement without the necessity of matching screw holes. In prior constructions, it was necessary to have the members which were to be retained in position by a screw or the like, of precise dimensions in order that the screw holes in such members could be brought into proper registry.

By the present construction, all of the disadvantages of such prior constructions are eliminated. Members may be of various lengths since the problem of matching screw holes is not encountered, and they may thus be constructed at a cost considerably below that of such prior constructions. Another distinct advantage of a screw member of this construction is the ready attachment and assembly of the members operated upon. If it is desired to draw these members into contacting, seating or operative engagement, it is only necessary to give to the screw a minimum turn, the tip of the screw properly aligning and guiding the threads into a position for intercepting a portion of the other member, such as a ledge, flange, or the like.

A still further object of the invention is to provide a screw construction formed with an enlarged head, a shank of substantially equal diameter, a tapered tip or projection at the end of said shank, and screw threads of substantially equal diameter extending to adjacent the head and there merging into a narrow shoulder portion.

Other objects are to provide a construction of maxi-member simplicity, efficiency, economy and ease of assembly and operation, and such further objects, advantages and capabilities as will later more fully appear and are inherently possessed thereby.

The invention further resides in the combination, construction and arrangements of parts illustrated in the accompanying drawings, and while there is shown therein a preferred embodiment, it is to be understood that the same is susceptible of modification and change without departing from the spirit of the invention.

In the drawings:

Fig. 1 is a view in perspective of the novel construction of screw.

Fig. 2 is a view in rear elevation, while Fig. 3 is a view in front elevation of the screw member.

Fig. 4 is a view in vertical cross section through sash members of a store front construction, the screw being shown in a position for retaining the sash members in operative relation.

Referring more particularly to the disclosure in the drawings, the novel screw construction comprises a tapered head 1 provided with slots 2 and 3, a shoulder 4 adjacent said head, a shank 5 of substantially equal diameter throughout its length except at the end portion where it is provided with a gradually tapered tip 7, and spaced screw threads 8 of substantially equal diameter. As clearly disclosed in Figs. 1 and 4, the threads are spaced a substantial distance apart and merge into the shoulder portion 4, which is of a diameter equal to that of the threads.

In Fig. 4 of the drawings is disclosed the novel screw construction in position for maintaining an inner and outer sash member of a widow construction in assembled position. The outer sash member comprises a moulding 9 having a glass engaging portion 10 and a lower inwardly extending portion 11 provided with an upstanding flange or rib 12. The inner sash member is shown as comprising a pane seating portion 13, a glass engaging portion 14 doubled upon itself to provide a backing 15, base 16, and a flange or upwardly extending portion 17 forming a gutter between the same and the backing member 15. The rear sash member or pane seating section is shown as anchored to the sill or floor by retaining means 18 such as screws or the like.

Suitably spaced in the backing member are openings for the reception of the screws or helically grooved members. The threads of the screws or helically grooved members are adapted to draw inwardly and adjustably position the outer sash member or moulding. The tapered end or tip 7 of the shank 5 will align and ride over the edge of the rib or flange 12 of the outer moulding or sash member and these threads will engage with such rib or flange. These threads are suitably spaced so that the grooves therebetween are of a size sufficient to intercept and hold the rib or flange. Also the threads being of substantially equal diameter, contact with the shelf or glass holding portion 13 of the rear sash member and with the bottom or base of the outer sash member or moulding, and suitably brace this shelf or glass supporting member, thereby preventing any tipping or canting of either the face plate or moulding and the glass supporting member. The shoulder 4 of the screw member fits conformably within the opening in the backing member thus also preventing any tipping or canting of the screw due to vibration or other causes. As shown, the threads of the screw cannot contact with the edge of the glass but merely with the glass supporting member.

The novel construction of the screw or helically grooved member allows for the ready assembly, adjustment or replacement of the parts. A slight turn of the head of the screw member will draw the sash members into contacting and holding engagement with a pane of glass. This construction eliminates all matching of screw holes in the sash member and allows for ready shifting of the same.

Although the construction of the screw member is shown in combination with a pair of window sashes, it will be readily seen and appreciated that the same is adapted for a plurality of uses and in numerous constructions, the disclosure in Fig. 4 being merely an embodiment or showing of one of the uses to which the screw member may be applied.

Having thus disclosed my invention, I claim:

A lip-engaging screw comprising a shank of approximately uniform diameter throughout its length, and having a head at one end, said shank having an enlarged portion of substantial diameter adjacent to said head, a helical lip-engaging flange of substantially rectangular cross section extending longitudinally of said shank and merging at one end into said enlarged portion, said flange and said enlarged portion being of approximately the same diameter, so that the screw may be supported thereby with the shank axially centered, said shank projecting beyond the other end of said flange a substantial distance to provide a lip-engaging-aligning guide cooperating with said flange and said extension to accurately position said screw with respect to the lip to be engaged thereby.

In witness whereof, I hereunto subscribe my name to this specification.

FRANCIS J. PLYM.